No. 864,008. PATENTED AUG. 20, 1907.
J. W. MALPHURS.
CAR COUPLING.
APPLICATION FILED FEB. 19, 1907.
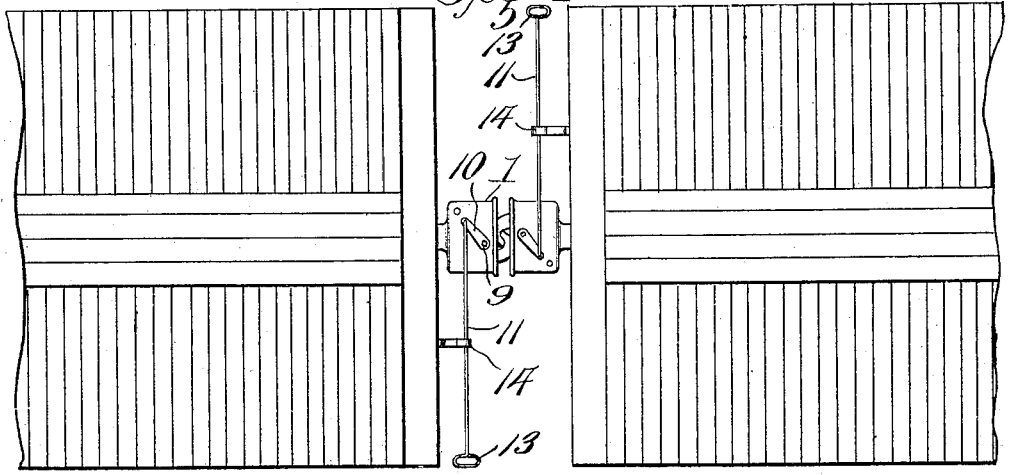
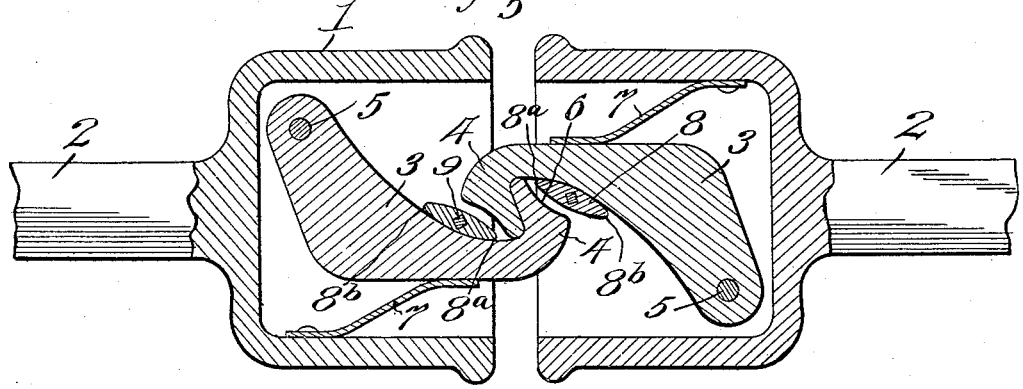
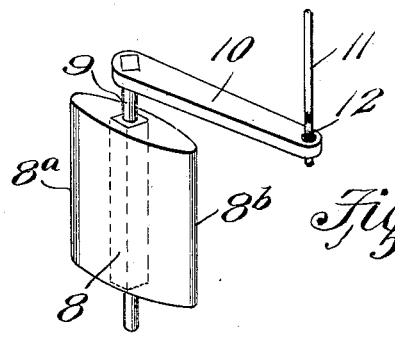
Inventor
Joel W. Malphurs
Witnesses
Frank B. Hoffman
C. C. Hines
By Victor J. Evans
Attorney

UNITED STATES PATENT OFFICE.

JOEL W. MALPHURS, OF GAINESVILLE, FLORIDA.

CAR-COUPLING.

No. 864,008.      Specification of Letters Patent.      Patented Aug. 20, 1907.

Application filed February 19, 1907. Serial No. 358,226.

*To all whom it may concern:*

Be it known that I, JOEL W. MALPHURS, a citizen of the United States of America, residing at Gainesville, in the county of Alachua and State of Florida, have invented new and useful Improvements in Car-Couplers, of which the following is a specification.

This invention relates to improvements in car couplers, the object of the invention being to provide a car coupler having an engaging hook mounted within a chambered drawhead and normally held in operative position and cushioned by the action of a back spring combined with means for throwing the hook to release position, the construction being such as to secure an effective coupling and uncoupling action between the hooks of opposing couplers, so as to adapt the same to readily couple and uncouple, to sustain the shocks and jars to which devices of this kind are subjected, to couple directly when the hooks of opposing couplers come into contact, and to be released without the necessity of a trainman going between the cars.

In the accompanying drawing,—Figure 1 is a top plan view of two couplers embodying my invention, shown in coupling engagement. Fig. 2 is a horizontal transverse section of the same. Fig. 3 is a detail of the dog and its operating means.

Referring to the drawing, the improved coupler is shown as comprising a hollow or chambered drawhead 1, from which extends the usual shank 2. Arranged within the drawhead is a coupling element 3, which is longitudinally curved and in the general form of a hook, being provided with a hooked engaging end 4, adapted to project beyond the front end of the drawhead. The opposite end of the hook is pivotally mounted upon a pin 5 extending vertically through the drawhead, and the outer face of the hook portion 4 is formed with a beveled contact surface 6 for a purpose presently explained. The couplers are designed in practice to be mounted in "rights" and "lefts" at opposite ends of a car, as clearly illustrated in Fig. 2, so that the hooked terminals of said coupling hooks will be arranged for ready and free interlocking engagement.

It will be observed that the beveled faces 6 of the coupling ends of the hook enable them when coming in contact to ride freely upon one another, so that they will move into engagement in an easy and efficient manner.

Secured at one end to the drawhead is a curved leaf spring 7, the opposite or free end of which is arranged to bear against the outer or convex side of the coupling hook to normally hold said hook in engaging position. This spring yieldingly backs the hook so as to adapt it to yield when an opposing coupler comes in contact therewith, thus providing for a cushioning action. The spring bears against the coupling hook at a point diametrically opposite the point of bearing contact of said hook with a releasing cam or dog 8, said dog being mounted upon a vertical shaft or pin 9 extending to the exterior and connected at its upper end with a crank arm 10.

As shown, the dog is preferably of elliptical form to provide opposite engaging ends or portions $8^a$ and $8^b$. In one position the dog is adapted to lie longitudinally against the concave face of the coupling hook and between the same and the beveled face 6 of the opposing hook to hold said hook in coupling position against the pressure of the spring 7. By turning the dog at right angles to such position the bearing edges $8^a$ and $8^b$ thereof will respectively engage the concave face of the coöperating hook and the beveled face of the opposing hook and spread the same apart against the resistance of the springs, thus releasing the hooks from engagement with each other for the uncoupling operation. In the operation of uncoupling, the tips of the engaging hooks of the opposing couplers will come in contact and ride over one another against the resistance of the springs, which latter will then throw them into interlocking engagement.

In order to operate each coupling hook a rod 11 is provided extending horizontally toward one side of the car. The inner end of the rod is provided with a downturned end 12 pivotally engaging the crank arm 10, while the outer end of the rod is formed with a suitable handle 13, by which it may be manipulated. The rod slides in a bearing 14 on the end of the car, whereby it is supported and guided in its movements. In the operation of uncoupling, one of the coupling hooks may be thrown to an open or release position so that it will freely engage the opposing coupling hook when the couplers come together, the jar of contact releasing the dog and freeing the open coupling hook so that said hook will be forced into locking position by its actuating spring.

It will be observed that the springs not only serve to hold the coupling hooks in bearing engagement with the releasing dog, but that the latter, when the hooks of opposing couplers are in engagement, lie at such an angle and in such a position that the manipulation of either dog will simultaneously throw both hooks out of engagement, the arrangement of the springs being also such as to permit the couplers to have freedom of action to conform to the lateral oscillation or turning movements of the cars. Vertical movement is provided for by the free adaptability of the engaging hooks to ride up and down upon one another without throwing them out of coupling engagement. The handles 13 of the levers 11 are so arranged that a trainman may release the couplers from either side without the necessity of going between coupled cars, thus preventing the accidents common in the use of the ordinary link and pin couplers.

It will be apparent from the foregoing description, taken with the illustrated disclosure of the invention, that the latter provides a coupler which is simple of construction, capable of being manufactured at a low cost and adapted to easily couple and uncouple. Owing to the peculiar form and arrangement of the hooks of opposing couplers, it will be furthermore apparent that the hooks of two couplers are adapted to engage immediately as soon as the drawheads abut, thus obviating the necessity of bringing cars together a number of times before the coupling action is effected.

Having thus described the invention, what is claimed as new, is:—

A car coupler comprising a chambered drawhead, a pivoted coupling hook arranged therein and having a coupling arm projecting therefrom and terminating in a coupling hook, the inner faces of the arm and hook being concaved, a rocking dog arranged to engage the concaved face of the arm and concaved face of the hook of an opposing coupler, said dog being of elliptical form in cross section and adapted to lie between said concaved surfaces when the coupling devices are in engagement, said dog having contact points in major axial alinement to respectively engage said surfaces when the dog is turned to uncoupling position, means for rocking the dog, and a cushioning supporting spring fixed at one end to the inner face of the outer side of the drawhead and bearing at its free end against the outer face of the coupling arm at a point substantially on a transverse line passing through the minor axis of the dog.

In testimony whereof, I affix my signature in presence of two witnesses.

JOEL W. MALPHURS.

Witnesses:
T. B. ELLIS, Jr.,
JNO. W. BLANDING.